United States Patent Office 3,421,870
Patented Jan. 14, 1969

3,421,870
LOW-TEMPERATURE CATALYTIC HYDROGENOLYSIS OF HYDROCARBONS TO METHANE
John H. Sinfelt, Berkeley Heights, William F. Taylor, Scotch Plains, and Jerzy Dembinski, Chatham, N.J., assignors to Esso Research and Engineering Company, a corporation of Delaware
No Drawing. Filed Feb. 17, 1964, Ser. No. 345,095
U.S. Cl. 48—213      8 Claims
Int. Cl. C01b *2/16;* B01j *11/06*

ABSTRACT OF THE DISCLOSURE

A catalyst of promoted $Ni\text{-}Al_2O_3$ or $Ni\text{-}SiO_2$ is used at temperatures of about 500 to about 925° F. for reacting higher hydrocarbons with hydrogen to form methane.

---

This invention relates to a process for producing methane by hydrogenolysis of higher molecular weight hydrocarbons in the presence of a very active nickel catalyst that is capable of converting $C_5$ to $C_{10}$ aliphatic hydrocarbons completely to methane at low reaction temperatures with low heat input.

There are a number of reasons to have a process for obtaining a methane-rich gaseous product which consists of methane or of methane mixed with hydrogen and substantially free of carbon oxides and free of water. Such a methane-rich gas is useful as a high heating value fuel gas. It can be used for increasing the heating value of a Town Gas that contains high proportions of $CO_2$. It has technical uses as an inert gas in various processes. The high H/C ratio of methane makes it useful as a source of hydrogen and as a reducing agent. It does not require purification treatments to remove CO, $CO_2$, $H_2O$ or other components. A methane-hydrogen mixture is also useful as a reactant in fuel cells.

The very active catalysts suitable for use in this process are similar to the catalysts having high activity and high activity maintenance in the reaction of steam with paraffinic naphtha hydrocarbons to form a Town Gas product which contains $CH_4$ with $CO_2$ and $H_2$, as described in U.S. applications S.N. 317,799, now U.S. Patent 3,320,182, issued May 16, 1967, and S.N. 317,828, now U.S. Patent 3,351,566, issued Nov. 7, 1967, filed by W. F. Taylor et al., Oct. 21, 1963. The preparation and characteristics of these catalysts will be explained herein. They are principally characterized by their high total surface areas in the range of 100 to about 300 square meters per gram and high nickel surface areas in the range of 20 to 60 square meters per gram of catalyst.

Methane can be obtained from natural gas, or as a product of high-temperature cracking, reforming, or other gas producing processes, but such sources are not always economically feasible for the supply desired, and in general, the concentration or purification of the methane from such sources is expensive.

The present invention provides a process that has been demonstrated to be able to produce substantially pure methane under elevated pressures from normally liquid hydrocarbons which can be economically transported and advantageously employed for a low heat input, low-temperature catalytic hydrogenolysis for production of the methane. The catalytic hydrogenolysis has flexibility in being able to produce in a single reaction zone a gas product of composition and heating value which can be varied over a wide range; if desired, e.g., 300 to 1000 B.t.u./per standard cubic foot. In this process, various other gaseous compounds can be present with the hydrogen. The catalysts have nickel surface areas of 20 to about 60 square meters per gram of catalyst, and the nickel and promoter metals are highly interspersed with alumina or silica, interacting or bonded together.

The catalytic hydrogenolysis for production of a gas product which is principally methane, substantially free of carbon monoxide, carbon doxide, and $H_2O$, is a reaction of a higher hydrocarbon, such as heptane, with hydrogen in the presence of the very active nickel catalyst at temperatures in the range of 500° to 925° F. under elevated pressures, e.g., 100 to 1000 p.s.i.g. By carrying out the process at a suitable space velocity with sufficient hydrogen, substantially all the hydrocarbon reactant is converted to methane as in the following reaction equation: $C_7H_{16}+6H_2 \rightarrow 7CH_4$. Excess $H_2$ is beneficial for prolonging the life of the catalyst and may be used for obtaining a gas product suitable as a reducing gas, as fuel gas, and for other purposes.

The process operates with varying $H_2$ to hydrocarbon ratios and at various degrees of conversion. At high $H_2$/hydrocarbon ratio, the heating value tends towards 300 B.t.u./s.c.f., while for the stoichiometric ratio of $H_2$/hydrocarbon, the heating value tends towards 1000 B.t.u/s.c.f. The proportion of hydrogen admixed is generally at least $(n-1)$ moles $H_2$ per mole of hydrocarbon to be reacted where $n$ is the number of carbon atoms in the hydrocarbon molecule, e.g., as in $C_nH_{2n+2}+(n-1)H_2$.

The process is particularly valuable where high pressure $H_2$ is available, such as from a catalytic reformer, and the hydrogen thus used may have a substantial amount of methane or other hydrocarbons present. Other processes for generating hydrogen may be used as sources of hydrogen supply.

In using the very active nickel catalyst, varying space velocities may be used. The space velocity is measured in terms of weight of the hydrocarbon fed per hour per weight of catalyst, and is abbreviated w./hr./w. The space velocity may range from 1 w./hr./w. to 50 w./hr./w. or higher, depending on such other factors as catalytic activity, temperature, and amount of conversion desired.

The method of preparing the very active nickel catalyst is important in order to obtain the high surface areas of nickel and of total catalyst. The total surface area of the catalyst is measured by the $N_2$ gas adsorption test and the nickel surface area is measured by $H_2$ chemisorption. These high surface area catalysts are obtained by coprecipitation of nickel with ions derived from aluminum salts or of nickel with silicate ions such as those derived from sodium metasilicate as hydroxides, carbonates, or basic carbonates from aqueous solutions of the salts using $NH_4HCO_3$ as the precipitating agent at temperatures of 32° to about 212° F., or the boiling point of the solutions, followed by low temperature drying of the precipitates (200° to 400° F.), calcining of the dried precipitates in air at 400° to 750° F. and activation of the calcined precipitates by hydrogen at 600° to 750° F. The promoters are admixed as decomposible compounds with the precipitates, e.g., hydroxides, carbonates or nitrates, and the preferred promoting metals are Ba, Sr, Cs, Ce, La, Y, Fe, K and Ca. The promoters may be present in the activated catalyst as oxides, carbonates, or both oxides and carbonates in amounts of about 1 to 10 wt. percent of the promoter metal. The catalyst may be about 1 to 5 mm. in particle size or be compressed into larger pellets of any desired shape made from such particles.

The hydrocarbons which may be used as the feed range from $C_2$ to $C_{12}$ or higher. Use of liquid $C_5$ to $C_{12+}$ hydrocarbon feed is advantageous for pumping the feed to the desired reaction pressure. The hydrocarbon feed may contain normally gaseous hydrocarbons such as ethane, propane, and butane, that undergo hydrogenolysis under the reaction conditions. The hydrocarbon feed may contain unsaturated, branched, and cyclic hydrocarbons; however, the unsaturated hydrocarbons tend to use up hydrogen and the cyclic hydrocarbons are more apt to undergo side reactions such as aromatics formation.

The hydrocarbon feed may be preheated with the aid of heat transfer from the exothermic reaction zone by indirect heat exchange.

The process of the invention is demonstrated as follows:

EXAMPLE 1

The naphtha hydrocarbon feed of technical n-heptane was passed at a space velocity of 20 w./hr./w. over a very active nickel-silica catalyst having a high nickel surface area, and $H_2$ was mixed with hydrocarbon at a mole ratio of 5/1 of $H_2$ to hydrocarbon. The feed entered the bed of catalyst at an inlet temperature of 850° F. In the reaction zone containing the catalyst bed, the reaction mixture was under a pressure of 200 p.s.i.g. When the steel reactor was not cooled externally and the operation was adiabatic, the bed temperature rose to 930° F. on account of the heat released by the hydrogenolysis. Cooling the reactor by indirect heat exchange with the hydrocarbon feed maintains a lower temperature, below 900° F., which is desirable for maintaining the activity of the catalyst. Under the conditions set forth, 65% of the n-heptane was converted to methane, which was essentially the only conversion product. Gas chromatography showed the presence of only trace amounts of $C_2$ or higher hydrocarbons.

The active nickel-silica catalyst used in the foregoing experiment was prepared by a special coprecipitation technique and analyzed 43.7 wt. percent nickel. It had a total surface area of 304 m.$^2$/g. (by $N_2$ adsorption measurement) after calcination.

The nickel-silica catalyst of high surface area was prepared by adding 5 g. of acid washed kieselguhr to 3.5 liters of deionized water, then adding to the resulting slurry 750 g. of $Ni(NO_3)_2 \cdot 6H_2O$ and 320 g. of $Na_2SiO_3 \cdot 9H_2O$, and heating to boiling while stirring. The Ni and silicate ions were coprecipitated by adding 800 g. of $NH_4HCO_3$ to the heated slurry. After the precipitation was completed, the slurry was boiled and stirred for an additional 3 hours. The resulting slurried solid was then separated by filtration and washed repeatedly. The washed solids were dried overnight at 230° F. and then calcined for 4 hours in air in an oven at 750° F. The calcined catalyst was reduced with $H_2$ at 700° F. for 15 hours to reduce the nickel oxide formed during calcination. The reduced nickel surface area was 60 m.$^2$/g.

EXAMPLE 2

Using a nickel-alumina catalyst containing 48.7 wt. percent nickel and having a nickel surface area of 30 m.$^2$/g. catalyst, a feed containing 50 wt. percent of n-hexane and 50 wt. percent of n-heptane is contacted with the catalyst at a space velocity of 1.0 w./hr./w. under a pressure of 200 p.s.i.g. with 10 moles of $H_2$ added per mole of hydrocarbon at an inlet temperature of 700° F. to obtain substantially complete conversion (>99%) of the feed hydrocarbons to methane.

This nickel-alumina catalyst was made by dissolving 750 g. of $Ni(NO_3)_2 \cdot 6H_2O$ and 740 g. of $Al(NO_3)_3 \cdot 9H_2O$ in 3.0 liters of deionized water. Coprecipitation was carried out by adding 1040 g. of $NH_4HCO_3$ to the boiling solution while stirring. At the end of the addition the slurry was stirred an additional 2 hours at the boiling point and then filtered. The mixture was dried overnight at 230° F. and then calcined in air for 4 hours at 750° F. The catalyst analyzed 48.7 wt. percent nickel and had a total surface area of 195 m.$^2$/g. catalyst. The calcined catalyst was activated by treatment with $H_2$ at 850° F. to reduce the nickel oxide in the catalyst, and following the reduction the nickel surface area of the catalyst was determined to be 30 m.$^2$/g. of total catalyst.

The invention described is claimed as follows:

1. Process for producing methane which comprises reacting hydrocarbons containing at least two carbon atoms per molecule with admixed hydrogen in a gaseous reaction mixture at a temperature in the range of about 500° to 925° F., at superatmospheric pressure and in the presence of a nickel catalyst which has a nickel surface area in the range of 20 to about 60 m.$^2$/g. and recovering a resulting gas reaction product containing principally methane and any excess $H_2$.

2. The process of claim 1, in which the hydrocarbons in the gaseous reaction mixture are predominantly paraffinic hydrocarbons having from 2 to 12 carbon atoms per molecule, and the hydrogen is admixed in a proportion of at least $(n-1)$ moles of $H_2$ per mole of hydrocarbon to be reacted, where $n$ is the number of carbon atoms in the hydrocarbon molecule.

3. The process of claim 1 wherein the pressure is from about 100 to about 1000 p.s.i.g. whereby the gas reaction product is free of any substantial amount of CO, $CO_2$ and $H_2O$.

4. Process for producing methane by exothermic hydrogenolysis of mainly paraffinic naphtha hydrocarbons which comprises passing vapor of the hydrocarbons and hydrogen under superatmospheric pressure at a temperature of about 650° to 850° F. into a reaction zone containing a bed of a nickel catalyst which contains nickel highly interspersed with an oxide of the group consisting of alumina and silica in proportions to give the catalyst a nickel surface area of 20 to about 60 m.$^2$/g. and a total surface area of 100 to about 300 m.$^2$/g., reacting the hydrocarbons with sufficient hydrogen passed through the reaction zone at a space velocity of from about 1 w./hr./w. to 50 w./hr./w. to convert at least 65% of the hydrocarbons to $CH_4$ with evolution of heat, removing heat from said reaction zone to maintain temperatures therein below 900° F., and withdrawing from the reaction zone a gaseous product containing the $CH_4$ formed.

5. The process as described in claim 4, in which the catalyst is obtained by coprecipitation of Ni and silicate ions.

6. The process as described in claim 4, in which the catalyst contains 40 to 60% Ni with 60 to 40% $Al_2O_3$ formed by coprecipitation of Ni with Al ions by $NH_4HCO_3$, an admixed promoter, the precipitate and admixed promoter being dried, calcined in air, and activated by reduction of nickel oxide with hydrogen.

7. The process as described in claim 4 in which the catalyst comprises a precipitate obtained by coprecipitation of Ni and silicate ions derived from sodium metasilicate.

8. The process as described in claim 4, in which the catalyst comprises a precipitate containing from 40 to 60% Ni with 60 to 40 $Al_2O_3$ formed by coprecipitating Ni with ions derived from aluminum salts by $NH_4HCO_3$, drying the precipitate, calcining the precipitate, and activating the precipitate by reducing the nickel oxide therein with hydrogen.

References Cited

UNITED STATES PATENTS

| | | | |
|---|---|---|---|
| 2,658,875 | 11/1953 | Schuit et al. | 252—452 |
| 2,734,809 | 2/1956 | Pettyjohn et al. | 48—197 |
| 3,106,457 | 10/1963 | Lockerbie et al. | 23—212 |
| 3,186,957 | 6/1965 | Stiles | 252—466 |
| 3,271,325 | 9/1966 | Davies et al. | 48—214 X |

FOREIGN PATENTS 641,332  8/1950  Great Britain.

JOSEPH SCOVRONEK, *Primary Examiner.*

U.S. Cl. X.R.

48—197; 252—459, 462, 463, 466; 260—676